US 8,507,820 B2

(12) United States Patent
Chen et al.

(10) Patent No.: US 8,507,820 B2
(45) Date of Patent: *Aug. 13, 2013

(54) SEALED DOME SWITCH FOR MOBILE ELECTRONIC DEVICE

(75) Inventors: Chao Chen, Waterloo (CA); Vijai Rajagopal, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 200 days.

This patent is subject to a terminal disclaimer.

(21) Appl. No.: 13/304,548

(22) Filed: Nov. 25, 2011

(65) Prior Publication Data

US 2012/0067712 A1    Mar. 22, 2012

Related U.S. Application Data

(63) Continuation of application No. 12/393,384, filed on Feb. 26, 2009, now Pat. No. 8,089,017.

(60) Provisional application No. 61/103,481, filed on Oct. 7, 2008.

(51) Int. Cl.
*H01H 1/10* (2006.01)

(52) U.S. Cl.
USPC .................. 200/515; 200/306; 200/302.2

(58) Field of Classification Search
USPC ............... 200/406, 512–515, 302.1, 302.2, 200/306
See application file for complete search history.

(56) References Cited

U.S. PATENT DOCUMENTS

| 4,390,765 | A   |   | 6/1983  | Sado                     |
|-----------|-----|---|---------|--------------------------|
| 4,449,024 | A   | * | 5/1984  | Stracener ........ 200/317 |
| 4,485,279 | A   |   | 11/1984 | Nakamura                 |
| 4,527,021 | A   | * | 7/1985  | Morikawa et al. ... 200/5 A |
| 4,771,139 | A   |   | 9/1988  | De Smet                  |
| 4,885,443 | A   |   | 12/1989 | Simcoe                   |
| 4,916,275 | A   |   | 4/1990  | Almond                   |
| 4,977,298 | A   | * | 12/1990 | Fujiyama ......... 200/5 A |
| 5,694,124 | A   | * | 12/1997 | Wood ............. 341/22 |
| 5,717,429 | A   | * | 2/1998  | Coulon et al. ..... 345/168 |
| 6,603,086 | B2  |   | 8/2003  | Kawaguchi                |
| 6,617,536 | B2  |   | 9/2003  | Kawaguchi                |
| 6,909,063 | B2  |   | 6/2005  | Nam                      |
| 6,917,007 | B2  |   | 7/2005  | Hirai                    |

(Continued)

FOREIGN PATENT DOCUMENTS

| EP | 0210973 | 2/1987 |
| EP | 0322515 | 7/1989 |

OTHER PUBLICATIONS

European Patent Application No. 09153829.8, Search Report dated May 26, 2009.

(Continued)

*Primary Examiner* — Xuong Chung Trans
(74) *Attorney, Agent, or Firm* — Louis B. Allard; Borden Ladner Gervais LLP

(57) ABSTRACT

A mobile electronic device has a dome switch assembly secured to the housing of the device, over a recess formed in the housing of device. The dome switch assembly has a substrate with a vent hole communicating between the recess of the housing and the space comprised between the substrate and a dome actuation portion of the dome switch assembly. Upon actuation of the dome switch assembly, air present between the dome actuation portion and the substrate flows into the recess of the housing.

18 Claims, 7 Drawing Sheets

(56) References Cited

U.S. PATENT DOCUMENTS 7,329,823 B2 2/2008 Sadamori
7,355,137 B2 4/2008 Kawasaki
2007/0034493 A1 2/2007 Kawasaki

OTHER PUBLICATIONS

U.S. Appl. No. 12/393,384, Notice of Allowance dated Oct. 21, 2011.

* cited by examiner

SEALED DOME SWITCH FOR MOBILE ELECTRONIC DEVICE

CROSS REFERENCE TO RELATED APPLICATIONS

This is a continuation of U.S. application Ser. No. 12/393,384 filed Feb. 26, 2009, which claims the benefit of priority of U.S. Provisional Patent Application No. 61/103,481 filed Oct. 7, 2008, both of which are incorporated herein by reference in their entirety.

FIELD OF THE DISCLOSURE

The present disclosure relates generally to dome switches. More particularly, the present disclosure relates to dome switches for mobile electronic devices.

BACKGROUND OF THE DISCLOSURE

Dome switches, which typically hold a small volume of air, are generally vented to atmosphere or to a buffer air volume in order to avoid significant increase in air pressure inside a given dome switch when it is depressed. Without providing such venting, or buffer air volume, repeated depression of the dome switches, and therefore the repeated air pressure increase/decrease cycle, can cause early failure. Further, such venting of dome switches, or buffer air volume, is desirable in order for the switches to have a tactile feel that is clear and sharp to the user.

Mobile electronic devices may include one or more dome switches. In many cases, such a mobile electronic device will have an array of domes switches with each dome switch of the array being in fluid communication with the other dome switches and, with the interior of their related mobile device. In such cases, the depression of one dome switch causes the air therein to flow towards the other dome switches and towards the interior of the mobile electronic device. Release of the depressed dome switch causes a reverse flow of air into the dome switch in question. Such arrays of dome switches may be susceptible to moisture and dust particulates present in the inside of the mobile electronic device. Further, having such humidity and dust particulates repeatedly flow inside the mobile electronic device can give rise to electrical charge accumulation and discharge, which can be deleterious to the operation of the mobile electronic device. This is a particular concern when the mobile electronic device in question is not sealed from the atmosphere, making it prone to variations in humidity and dust in the atmosphere.

In other mobile electronic devices, an array of dome switches has each of its dome switches in fluid communication with each other and with a dedicated sealed air chamber mounted inside its related mobile device. The presence of such dedicated air chambers has a significant effect on the size of the mobile devices.

In yet other personal communication mobile devices, the dome switches are in fluid communication only with each other, not with the interior of the mobile electronic device, or with a dedicated air chamber. Having the dome switches in communication only with each other makes for an increase in complexity of the manufacturing and testing of the mobile device.

Improvements in dome switches are therefore desirable.

BRIEF DESCRIPTION OF THE DRAWINGS

Embodiments of the present disclosure will now be described, by way of example only, with reference to the attached Figures, wherein.

DETAILED DESCRIPTION

In the following description, for purposes of explanation, numerous details are set forth in order to provide a thorough understanding of the embodiments of the disclosure. However, it will be apparent to one skilled in the art that these specific details are not required in order to practice the disclosure.

The present disclosure also provides mobile electronic device that has a dome switch assembly. The dome switch assembly and the housing of the mobile communication device to which it is sealably secured, are such that when the dome of the switch assembly is depressed, the air present in the dome flows through a hole in the substrate of the dome switch assembly and into a recess formed in the housing. The recess provides a buffer space for the air contained in the dome portion of the dome switch assembly to enter upon depression of the dome. This mitigates deleterious effects related to too great an increase in air pressure in the dome of the dome switch assembly and, at the same time, inhibits the flow of moisture and dust particulates in and out of dome of the switch assembly.

Generally, the present disclosure is directed to a dome switch assembly for mobile electronic devices. Mobile electronic devices can include several types of devices including mobile stations such as simple cellular telephones, smart telephones, wireless Personal Digital Assistants (PDAs), and laptop computers with wireless 802.11 or Bluetooth capabilities. These devices can include wireless communication capabilities, and can run on a wide variety of networks, from data-only networks such as Mobitex and DataTAC to complex voice and data networks such as GSM/GPRS, CDMA, EDGE, UMTS and CDMA2000 networks. Further, mobile electronic devices can include other types of devices such as, for example, cameras, mobile gaming devices, and personal audio/video devices.

The dome switch assembly and the housing of the mobile electronic device to which it is secured are such that when the dome of the switch assembly is depressed, the air present in the dome flows through a hole in the substrate of the dome switch assembly and into a recess formed in the housing. The recess provides a buffer space for the air contained in the dome portion of the dome switch assembly to enter upon depression of the dome portion. This mitigates deleterious effects related to too great an increase in air pressure in the dome of the dome switch assembly and, at the same time, prevents moisture and dust particulates to flow in and out of dome of the switch assembly.

Figure 1:
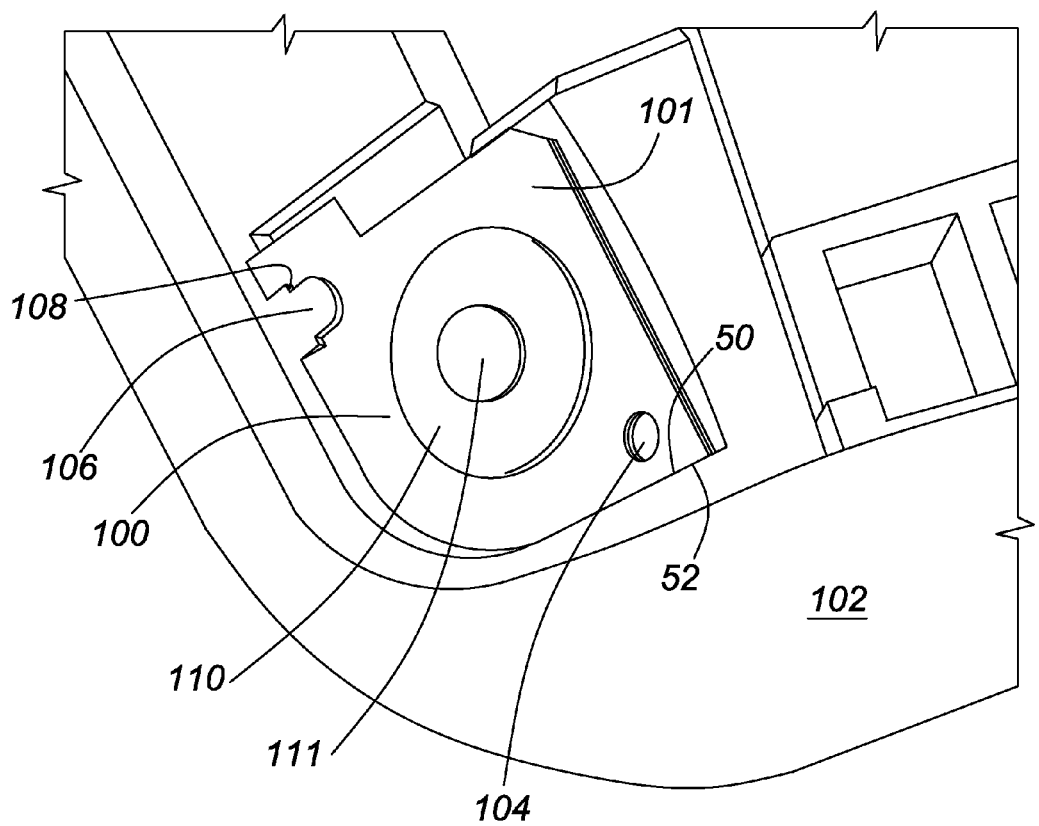
FIG. 1 shows a perspective view of a dome switch assembly secured to the housing of a mobile electronic device.

In accordance with an embodiment, FIG. 1 shows a dome switch assembly (DSA) 100 secured to the exterior of a housing 102 of a mobile electronic device. The DSA 100 can be used, e.g., as an On/Off switch for the mobile electronic device. Alternatively the DSA 100 can be used for other functions of the mobile electronic device, such functions including, for example, backspace, character, number, and camera mode activation. The DSA 100 and the housing 102 can have complementary alignment features to facilitate securing the DSA 100 to the housing 102. The complementary alignment features can include, for example, a lug 106 formed on the housing 102 and a slot 108 formed on the DSA 100; an edge 50 of the DSA 100 and an abutting wall or surface 52 of the housing 102; or any other suitable complementary alignment features, such as, for example, a hole and a post. The DSA 100 includes a dome actuation portion (DAP) 110 that can include a biaxially-oriented polyethylene terephthalate (boPET) polyester material such as, for example, Mylar™, or any other suitable resilient material that can yield to force applied by a user. The DAP 110 has a button actuator 111. Depressing the DAP 110 actuates the DSA 100 by causing two or more terminals under DAP 110 to become electrically coupled, thereby closing the switch and allowing current to flow though the DSA 100. The DAP 110 can also be referred to as a domed convex portion.

Figure 2:
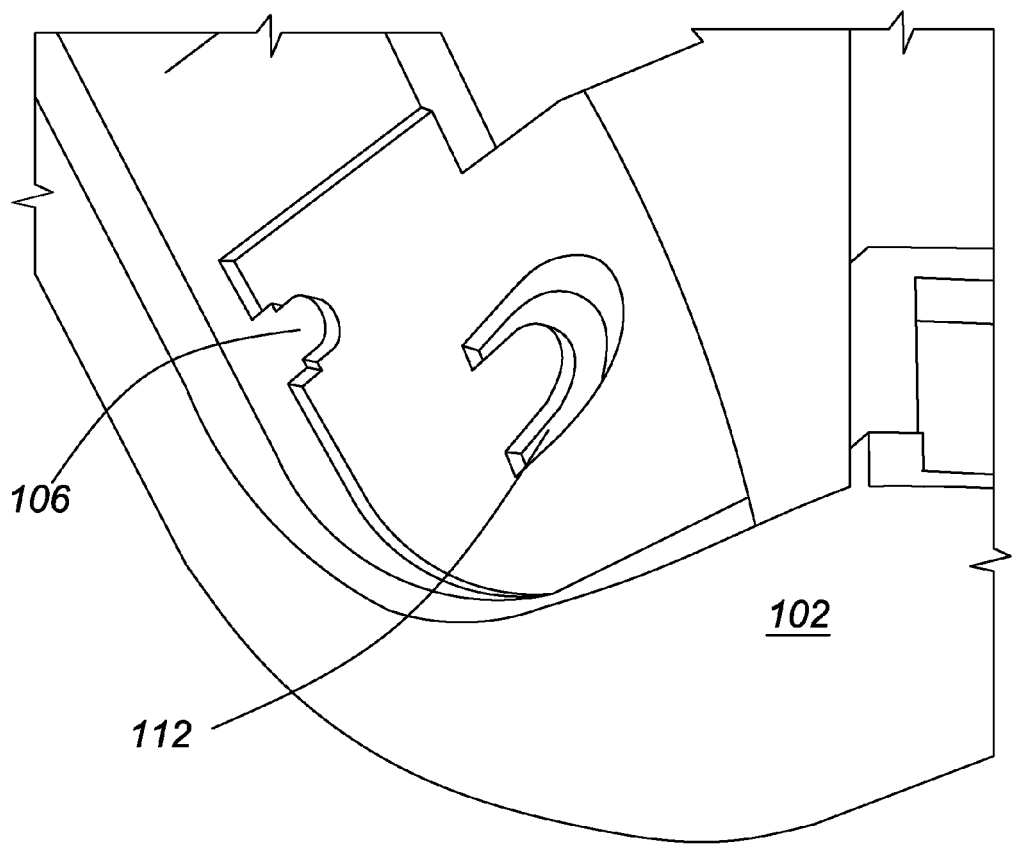
FIG. 2 shows a perspective view of a recess formed in the housing shown at FIG. 1.

FIG. 2 shows a recess (or air pocket) 112 formed in the housing 102. The recess 112 is not connected to the interior of the mobile electronic device, i.e., the recess 112 does not traverse the housing 102 from one side to the other. The recess 112 can have any suitable shape and volume.

As is apparent from FIGS. 1 and 2, the DSA 100 being secured to the housing 102 seals the recess 112 from the environment outside the housing 102, and therefore seals the recess 112 from the environment outside the MED. The DSA 100 can be secured the housing through any suitable means such as, e.g., an adhesive.

Figure 3:
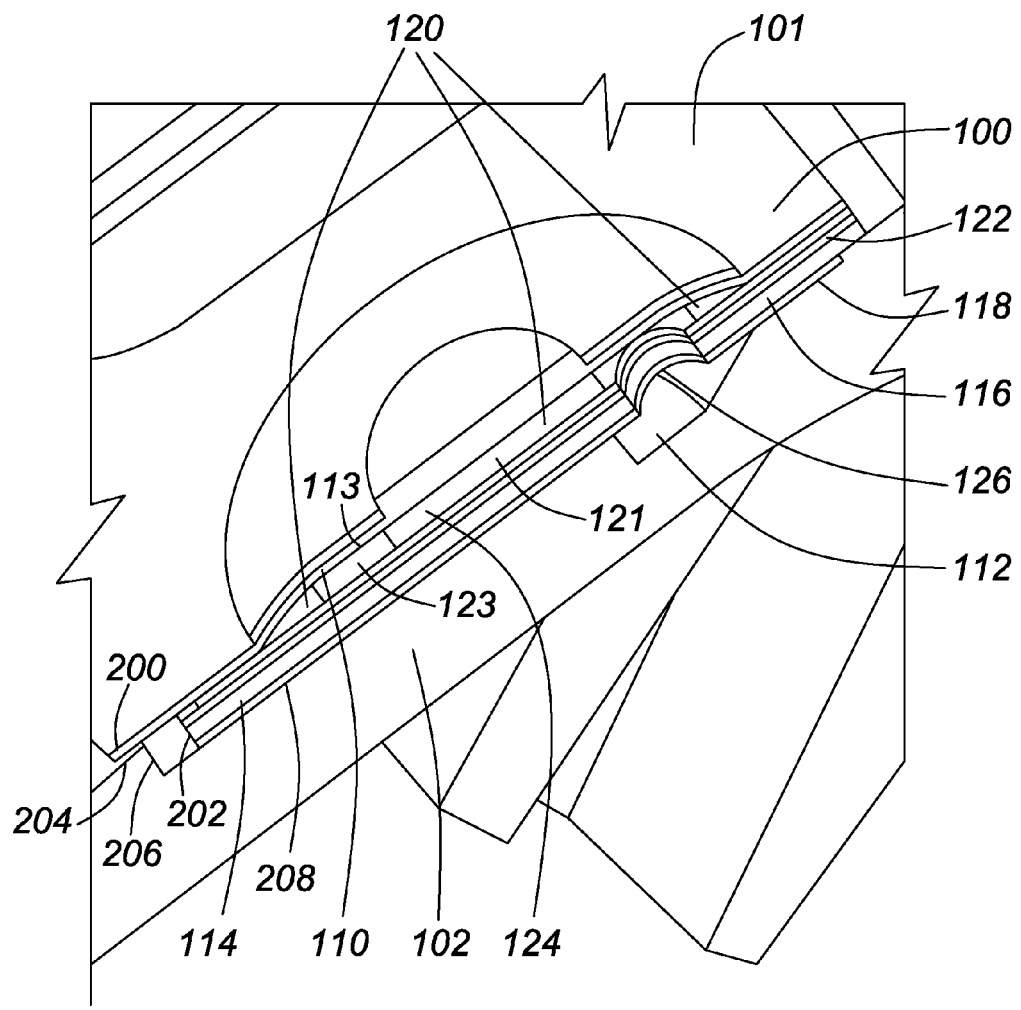
FIG. 3 shows a perspective cross-sectional view of the dome switch assembly and housing of FIG. 1.

FIG. 3 shows a perspective, cross-sectional view of the DSA 100 secured to the housing 102. The DSA 100 has an outer layer 101, which includes the DAP 110. The DSA 100 also has a substrate 114 that can include a rigid material or stiffener 116 secured to the housing 102 through an adhesive layer 118. The substrate 114 can also have a flexible printed circuit (FPC) 120 secured to the stiffener 116 through an adhesive 122. The FPC 120 can have electrodes 121 and 123. The substrate 114 and the DAP 110 define a dome volume 124, which is in fluid communication with the recess 112 through a hole 126 formed in the substrate 114. Any suitable stiffener material and adhesives can be used. The hole 126, which can also be referred to as a passageway, can be formed, for example, by laser drilling or by any other suitable means. The formation of the hole 126 can be done once the stiffener 116 and the FPC 120 have been secured together through any suitable means (e.g., an adhesive). The DAP 110 can include an electrically conductive element, such as a flexible conductor 113, that, upon the DAP 110 being depressed by a user to touch electrodes 121 and 123, will form an electrical connection between the electrodes 121 and 123 to initiate a function of the mobile electronic device. The flexible conductor 113 can be, for example, in the form of a flexible metal dome. The substrate 114 and the outer layer 101 can each define an alignment hole to facilitate alignment with each other. An example of such aligned alignment holes is shown at reference numeral 104 of FIG. 1.

FIG. 3 also shows a ledge 200 of the outer layer 101 extending beyond an edge 202 of the substrate 114. This allows for the ledge to be secured (through any suitable means, such as, for example, adhesives) to the top portion 204 of a step 206 that extends from a securing surface 208 of the housing 102, to which the substrate 114 can be secured through any suitable means (e.g., adhesive layer 118). As will be understood by the skilled worker, the DSA 100 can have a ledge, such as ledge 200, extending beyond any portion of the outside perimeter of the substrate 114.

Upon depressing the DAP 110, air (or any other gas or fluid) present in the dome volume 124 will flow through the hole 126 and into the recess 112. The recess 112 thus provides a buffer space for the air of the of the dome volume 124 to enter upon depression of the DAP 110 and thereby mitigates deleterious effects related to too great an increase in air pressure in the dome volume 124. The embodiment of FIG. 3 is advantageous over prior art dome switches in that the recess 112 does away with the need to have a separate air chamber, distinct from the housing 102, in communication with the dome volume 124. The embodiment of FIG. 3 may be further advantageous in that the dome volume 124 is sealed from both the outside and the inside of the mobile electronic device housed by the housing 102 and, therefore, the risks related to the flow of moisture and dust particulates to and from the dome volume 124 is greatly diminished. The embodiment of FIG. 3 may further be advantageous in that it is relatively easy to manufacture; recess 112 can be merely another physical feature of the housing 102. If the housing 102 is formed by molding, for example, the mold for making the housing 102 may include a feature that forms the recess 112 in the housing 102.

Figure 4:
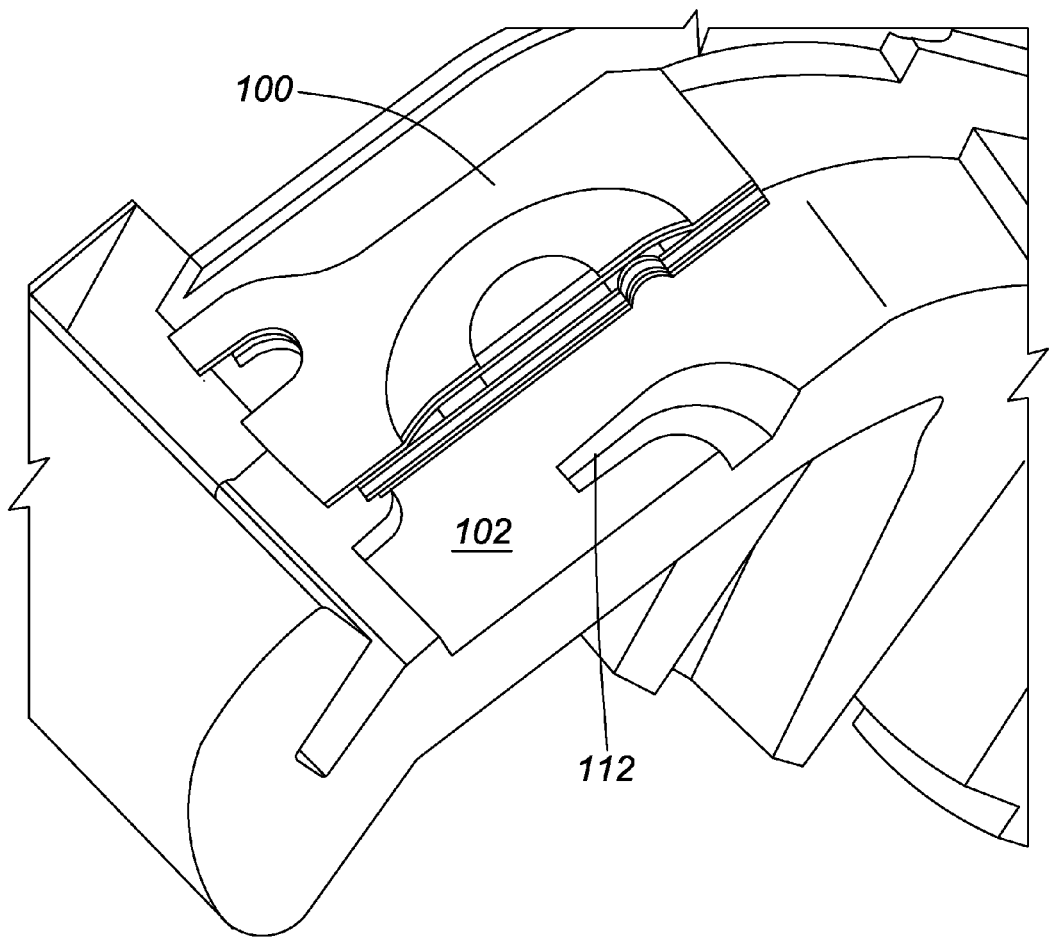
FIG. 4 shows a perspective exploded cross-sectional view of the dome switch assembly and housing of FIG. 1.

FIG. 4 shows a perspective, cross-sectional, exploded view of the housing 102 and the DSA 100. It is clear from this figure that that the recess 112 does not traverse the housing 102 from the exterior to the interior of the personal mobile communication device housed by the housing 102. FIG. 4 further shows that, depending upon the shape of the housing 102, the recess 112 can assume different dimensions or shapes. In the embodiment shown in FIGS. 3 and 4, the volume of air, or any other fluid, that can be received in the recess 112 is approximately three times the dome volume 124 under the DAP 110. This disclosure is not restricted to any particular volume that can be defined by the recess 112, but ordinarily the recess 112 would be able to receive at least twice the dome volume 124 under the DAP 110.

Figure 5:
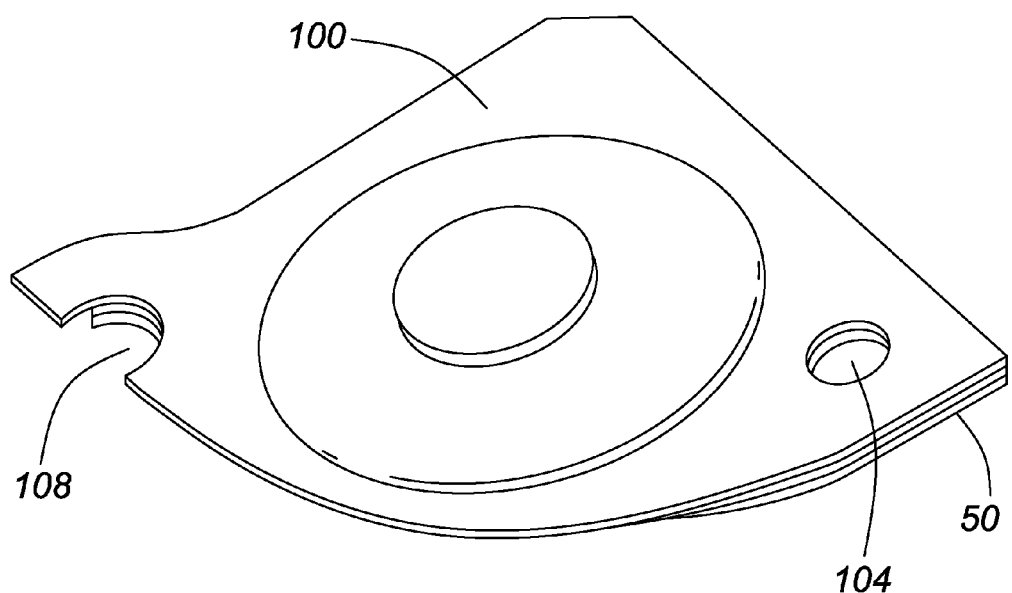
FIG. 5 shows a perspective view of the dome switch assembly of FIG. 1.

FIG. 5 shows the DSA 100 by itself with alignment features to facilitate alignment with the housing 102. The alignment features shown at FIG. 5 include the slot 108, and the edge 50, both of which were also shown at FIG. 1, cooperating respectively with the lug 106, and the abutting wall 52. Any suitable variety and number of alignment features can be provided on the DSA 100 with respective complementary features provided on the housing 102. Any number and variety of complimentary alignment features can be formed on the DSA 100 and the housing 102.

Figure 6:
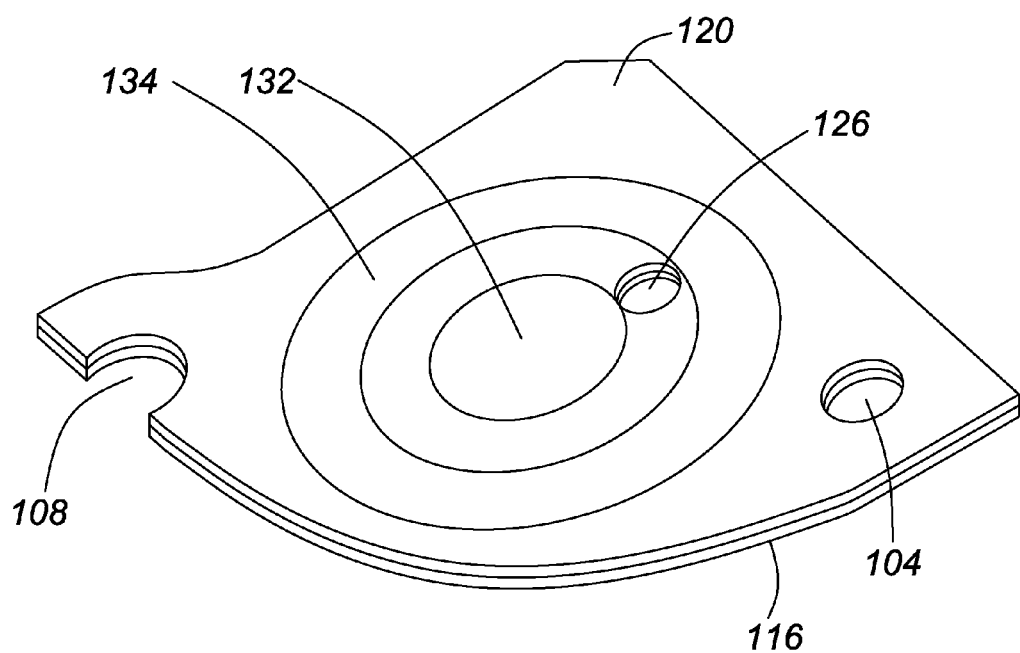
FIG. 6 shows a perspective view of a substrate of the dome switch assembly of FIG. 5.

FIG. 6 shows the FPC 120 adhered to the stiffener 116. The FPC 120 is shown with a disc-shaped electrical contact 132 (corresponding to electrode 121 of FIG. 3) and a ring-shaped electrical contact 134 (corresponding to electrode 123 of FIG. 3). The FPC 120 can have any suitable number of electrical contacts, each having any suitable shape. Depressing the DAP 110 brings an electrically conductive element of the DAP (e.g., the conductor 113 of FIG. 3) in contact with both the disc-shaped electrical contact 132 and the ring-shaped electrical contact 134, thereby closing the switch and allowing current to flow though the DSA 100. In the embodiment depicted in FIG. 3, DAP 110 includes an electrically conductive element that is in contact with the ring-shaped electrical contact 134, and depressing the DAP 110 brings the electrically conductive element in contact with the disc-shaped electrical contact 132. The disclosure is not limited to this manner of closing a dome switch, and the concepts described herein can be applied to many configurations of dome switches. Also shown at FIG. 6 is the hole 126 formed between the electrical contacts 132 and 134. The hole 126 can be of any suitable dimension (e.g., about 0.6 mm) and shape (e.g., the hole 126 can have a cylindrical shape with a circular cross-section), and can be formed at any suitable location on the FPC 120, including a location covered wholly or partly by an electrical contact. Any suitable number of holes connecting the recess 112 and the dome volume 124 can be formed in the FPC 120.

The button actuator 111 of FIG. 1, which can also be referred to as a puck, can be formed on the outer layer through any suitable means. For example, the outer layer 101 can have dimple or cavity formed on the DAP 110. The dimple or cavity can be filed with a hardening substance, e.g., glue, to form the button actuator 111.

Thus, the present disclosure provides a dome switch assembly for mobile electronic devices. The dome switch assembly and the housing of the mobile communication device to which it is sealably secured, are such that when the dome of the switch assembly is depressed, the air present in the dome flows through a hole in the substrate of the dome switch assembly and into a recess formed in the housing. The recess provides a buffer space for the air contained in the dome portion of the dome switch assembly to enter upon depression of the dome. This mitigates deleterious effects related to too great an increase in air pressure in the dome of the dome switch assembly and, at the same time, inhibits the flow of moisture and dust particulates in and out of dome of the switch assembly.

The following describes in more details, exemplary mobile electronic device that can include the dome switch assembly of the present disclosure. The mobile electronic device may be a two-way communication device with advanced data communication capabilities including the capability to communicate with other mobile electronic devices or computer systems through a network of transceiver stations. The mobile electronic device may also have the capability to allow voice communication. Depending on the functionality provided by the mobile electronic device, it may be referred to as a data messaging device, a two-way pager, a cellular telephone with data messaging capabilities, a wireless Internet appliance, or a data communication device (with or without telephony capabilities). The mobile electronic device may also be a mobile electronic device without wireless communication capabilities as a handheld electronic game device, digital photograph album, digital camera and the like.

Figure 7:
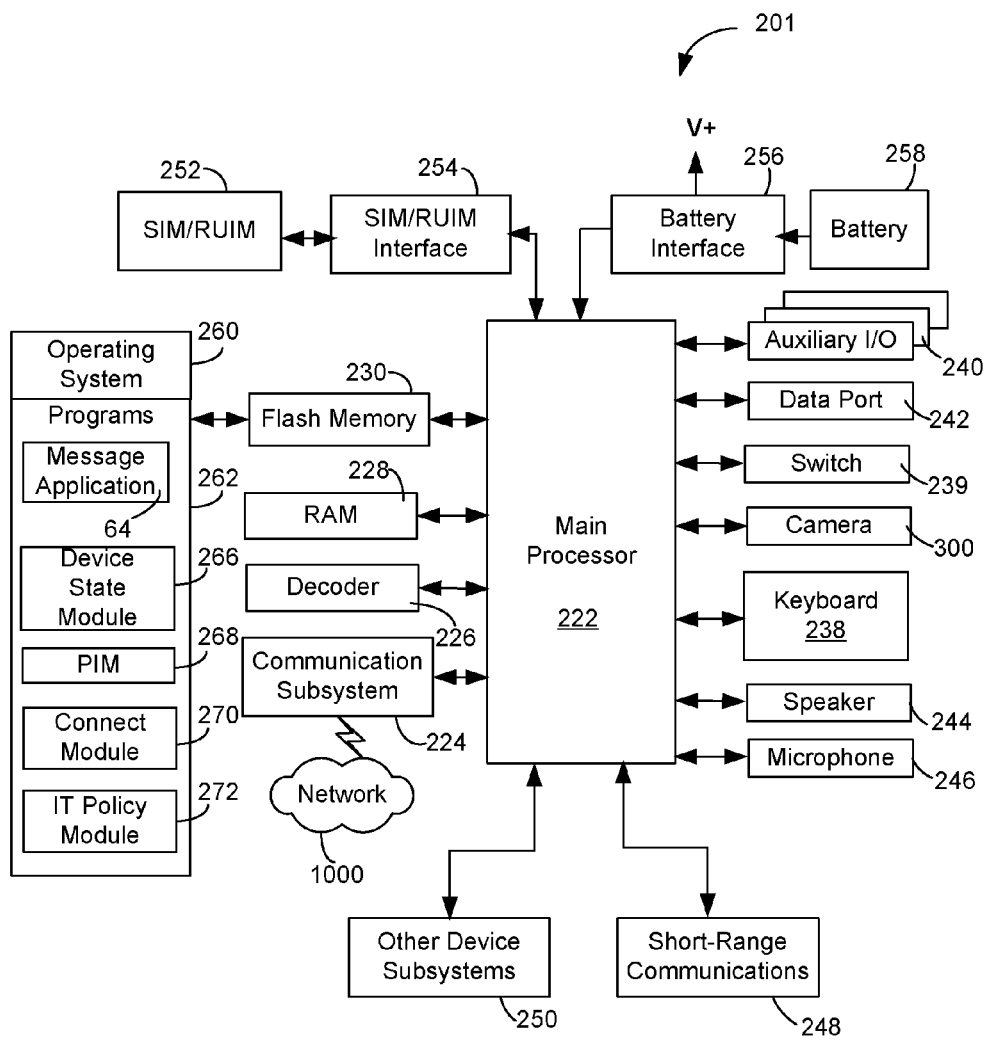
FIG. 7 is a block diagram of a mobile electronic device according to one example.

Referring FIG. 7, there is shown therein a block diagram of an exemplary embodiment of a mobile electronic device 201. The mobile electronic device 201 includes a number of components such as the processor 222 that controls the overall operation of the mobile electronic device 201. Communication functions, including data and voice communications, are performed through a communication subsystem 224. Data received by the mobile electronic device 201 can be decompressed and decrypted by a decoder 226, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 224 receives messages from and sends messages to a wireless network 1000. In this exemplary embodiment of the mobile electronic device 201, the communication subsystem 224 is configured in accordance with the Global System for Mobile Communication (GSM) and General Packet Radio Services (GPRS) standards. The GSM/GPRS wireless network is used worldwide. New standards such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 224 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the mobile electronic device 201 is a GSM/GPRS wireless network in one exemplary implementation, other wireless networks may also be associated with the mobile electronic device 201 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 222 also interacts with additional subsystems such as a Random Access Memory (RAM) 228, a flash memory 230, a display 232, a keyboard 238, a switch 239, an auxiliary input/output (I/O) subsystem 240, a data port 242, a speaker 244, a microphone 246, short-range communications 248, a camera 300, and other device subsystems 250. The DSA 100 described above can be used in the switch 239, or the keyboard 239, or in the camera 300, or in any combination of the switch 239, the keyboard 239 and the camera 300.

Some of the subsystems of the mobile electronic device 220 perform communication-related functions, whereas other subsystems may provide "resident" or on-device functions. By way of example, the keyboard 238 may be used for both communication-related functions, such as entering a text message for transmission over the network 1000, and device-resident functions such as a calculator or task list.

The mobile electronic device 201 can send and receive communication signals over the wireless network 1000 after network registration or activation procedures have been completed. Network access is associated with a subscriber or user of the mobile electronic device 201. To identify a subscriber according to the present embodiment, the mobile electronic device 201 uses a SIM/RUIM card 252 (i.e. Subscriber Identity Module or a Removable User Identity Module) inserted into a SIM/RUIM interface 254 for communication with a network such as the network 1000. The SIM/RUIM card 252 is one type of a conventional "smart card" that can be used to identify a subscriber of the mobile electronic device 201 and to personalize the mobile electronic device 201, among other things. In the present embodiment the mobile electronic device 201 is not fully operational for communication with the wireless network 1000 without the SIM/RUIM card 252. By inserting the SIM/RUIM card 252 into the SIM/RUIM interface 254, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 252 includes a processor and memory for storing information. Once the SIM/RUIM card 252 is inserted into the SIM/RUIM interface 254, it is coupled to the processor 222. In order to identify the subscriber, the SIM/RUIM card 252 can include some user parameters such as an International Mobile Subscriber Identity (IMSI). An advantage of using the SIM/RUIM card 252 is that a subscriber is not necessarily bound by any single physical mobile electronic device. The SIM/RUIM card 252 may store additional subscriber information for a mobile electronic device as well, including datebook (or calendar) information and recent call information. Alternatively, user identification information can also be programmed into the flash memory 230. The mobile electronic device 201 can also be enabled to receive additional memory cards. For example, memory card slots (not shown) can be provided in the mobile electronic device 201 to receive such cards.

The mobile electronic device 201 is a battery-powered device and includes a battery interface 256 for receiving a battery pack containing one or more rechargeable battery cells 258, and associated control circuitry (not shown) that, in some embodiments, can interface with the battery interface 256. The battery pack has a form factor and contact arrangement suited to the particular mobile electronic device. In at least some embodiments, the battery 258 can be a smart battery with an embedded microprocessor. The battery interface 256 is coupled to a regulator (not shown), which assists the battery 258 in providing power V+ to the mobile electronic device 201. Although current technology makes use of a battery, future technologies such as micro fuel cells may provide the power to the mobile electronic device 201.

The mobile electronic device 201 also includes an operating system 260 and software components 262 which are described in more detail below. The operating system 260 and the software components 262 that are executed by the processor 222 are typically stored in a persistent store such as the flash memory 230, which may alternatively be a read-only memory (ROM) or similar storage element (not shown). Those skilled in the art will appreciate that portions of the operating system 260 and the software components 262, such as specific software applications 264, 266, 268, 270 and 272, or parts thereof, may be temporarily loaded into a volatile store such as the RAM 228. Other software components can also be included, as is well known to those skilled in the art.

The subset of software components 262 that control basic device operations, including data and voice communication applications, will normally be installed on the mobile electronic device 220 during its manufacture. Other software applications include a message application 264 that can be any suitable software program that allows a user of the mobile electronic device 201 to send and receive electronic messages. Various alternatives exist for the message application 264 as is well known to those skilled in the art. Messages that have been sent or received by the user are typically stored in the flash memory 230 of the mobile electronic device 201 or some other suitable storage element in the mobile electronic device 201. In at least some embodiments, some of the sent and received messages may be stored remotely from the device 201 such as in a data store of an associated host system that the mobile electronic device 201 communicates with.

The software components 262 can further include a device state module 266, a Personal Information Manager (PIM) 268, and other suitable modules (not shown). The device state module 266 provides persistence, i.e. the device state module 266 ensures that important device data is stored in persistent memory, such as the flash memory 230, so that the data is not lost when the mobile electronic device 201 is turned off or loses power.

The PIM 68 includes functionality for organizing and managing data items of interest to the user, such as, but not limited to, e-mail, contacts, calendar events, voice mails, appointments, and task items. The PIM 268 has the ability to send and receive data items via the wireless network 1000. PIM data items may be seamlessly integrated, synchronized, and updated via the wireless network 1000 with the mobile electronic device subscriber's corresponding data items stored or associated, or both, with a host computer system. This functionality creates a mirrored host computer on the mobile electronic device 201 with respect to such items. This can be particularly advantageous when the host computer system is the mobile electronic device subscriber's office computer system.

The software components 262 also include a connect module 270, and an information technology (IT) policy module 272. The connect module 270 implements the communication protocols that are required for the mobile electronic device 201 to communicate with the wireless infrastructure and any host system, such as an enterprise system, that the mobile electronic device 201 is authorized to interface with.

The connect module 270 includes a set of APIs that can be integrated with the mobile electronic device 201 to allow the mobile electronic device 201 to use any number of services associated with the enterprise system. The connect module 270 allows the mobile electronic device 201 to establish an end-to-end secure, authenticated communication pipe with the host system. A subset of applications for which access is provided by the connect module 270 can be used to pass IT policy commands from the host system to the mobile electronic device 201. This can be done in a wireless or wired manner. These instructions can then be passed to the IT policy module 272 to modify the configuration of the device 201. Alternatively, in some cases, the IT policy update can also be done over a wired connection.

Other types of software applications can also be installed on the mobile electronic device 201. These software applications can be third party applications, which are added after the manufacture of the mobile electronic device 201. Examples of third party applications include games, calculators, utilities, etc.

The additional applications can be loaded onto the mobile electronic device 201 through at least one of the wireless network 1000, the auxiliary I/O subsystem 240, the data port 242, the short-range communications subsystem 48, or any other suitable device subsystem 250. This flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The data port 242 enables a subscriber to set preferences through an external device or software application and extends the capabilities of the mobile electronic device 201 by providing for information or software downloads to the mobile electronic device 201 other than through a wireless communication network. The alternate download path may, for example, be used to load an encryption key onto the mobile electronic device 201 through a direct and thus reliable and trusted connection to provide secure device communication.

The data port 242 can be any suitable port that enables data communication between the mobile electronic device 201 and another computing device. The data port 242 can be a serial or a parallel port. In some instances, the data port 242 can be a USB port that includes data lines for data transfer and a supply line that can provide a charging current to charge the battery 258 of the mobile electronic device 201.

The short-range communications subsystem 248 provides for communication between the mobile electronic device 201 and different systems or devices, without the use of the wireless network 1000. For example, the short-range communications subsystem 248 may include an infrared device and associated circuits and components for short-range communication. Examples of short-range communication standards include standards developed by the Infrared Data Association (IrDA), Bluetooth, and the 802.11 family of standards developed by IEEE.

Synchronization of files and data between the mobile electronic device 201 and another computing device can be achieved over the wireless network 1000, through the short-range communications system 248, or through a direct connection between the data port 242 of the mobile electronic device 201 and the other computing device. Synchronization causes the most recent version of files and data to be mirrored on either the mobile electronic device or the other computing device. As used herein, synchronization also refers to the downloading or uploading of pre-selected files from one device to the other. Synchronization of files and data can be initiated by the user of the device whenever a suitable connection between the mobile electronic device 201 and another computing device, such as a home computer, is detected, or can occur automatically when a connection is detected. A synchronization application, stored in the mobile electronic device 201 or the other computing device, or both, can determine the file and data types to be synchronized, the frequency of synchronization, and other parameters, appropriate to the particular synchronization algorithm implemented by the synchronization application.

In use, a received signal such as a text message, an e-mail message, or web page download is processed by the communication subsystem 224 and input to the processor 222. The processor 222 then processes the received signal for output to the display 232 or alternatively to the auxiliary I/O subsystem 240. A subscriber may also compose data items, such as e-mail messages, for example, using the touch-sensitive overlay 234 on the display 232 that are part of the touch screen display 38, and possibly the auxiliary I/O subsystem 240. The auxiliary I/O subsystem 240 may include devices such as: a mouse, track ball, infrared fingerprint detector, or a roller wheel with dynamic button pressing capability. A composed item may be transmitted over the wireless network 1000 through the communication subsystem 224.

For voice communications, the overall operation of the mobile electronic device 201 is substantially similar, except that the received signals are output to the speaker 244, and signals for transmission are generated by the microphone 246. Alternative voice or audio I/O subsystems, such as a voice message recording subsystem, can also be implemented on the mobile electronic device 201. Although voice or audio signal output is accomplished primarily through the speaker 244, the display 232 can also be used to provide additional information such as the identity of a calling party, duration of a voice call, or other voice call related information.

The above-described embodiments of the disclosure are intended to be examples only. Alterations, modifications and variations can be effected to the particular embodiments by those of skill in the art without departing from the scope of the disclosure, which is defined solely by the claim appended hereto.

What is claimed is:

1. A mobile electronic device (MED) comprising:
a housing defining a recess;
a dome switch assembly to initiate a function of the MED, the dome switch assembly having a substrate with a passageway defined therethrough, the substrate also having a perimeter, the dome switch assembly further having an outer layer in direct contact with the substrate, the outer layer being secured to the substrate, the outer layer having a dome actuation portion, the outer layer also having a ledge that extends beyond a portion of the perimeter, the dome actuation portion including an electrically conductive element, the substrate having an electrode formed on a side of the substrate that faces the dome actuation portion, the dome actuation portion and the substrate defining a dome volume therebetween, the dome switch assembly being secured to the housing to seal the recess from an outside environment of the MED, the passageway fluidly connecting the dome volume and the recess to allow fluid from the dome volume to flow through the passageway, and into the recess, upon depression of the dome actuation portion, the depression of the dome actuation portion to cause the electrically conductive element to contact the electrode to initiate the function of the MED, the housing having a securing surface with which the substrate is in direct contact and to which the substrate is secured, the housing further having a step extending from the securing surface, the step having a top to which the ledge of the outer layer is secured.

2. The device of claim 1 wherein the housing and the dome switch assembly have complementary alignment features to align the dome switch assembly to the housing.

3. The device of claim 2 wherein the complementary alignment features include an edge and an abutting surface.

4. The device of claim 2 wherein the complementary alignment features includes a lug and a slot.

5. The device of claim 2 wherein the complementary alignment features includes a post and a hole.

6. The device of claim 1 wherein the dome actuation portion includes a resilient dome-shaped material.

7. The device of claim 6 wherein the resilient dome-shaped material is an electrical insulator.

8. The device of claim 7 wherein the resilient dome-shaped portion includes a biaxially-oriented polyethylene terephthalate polyester material.

9. The device of claim 1 wherein an entirety of the outer layer is made of a resilient material.

10. The device of claim 1 wherein the substrate has two electrodes formed thereon and the passageway is formed between the two electrodes.

11. The device of claim 1 wherein the passageway defines a cylinder having a substantially circular cross-section.

12. The device of claim 1 wherein the substrate includes a stiffener with a flexible electrical circuit secured thereto, the flexible electrical circuit being disposed between the outer layer and the stiffener, the flexible electrical circuit including the electrode.

13. The device of claim 1 wherein the recess defines a recess volume, the recess volume being at least twice the dome volume.

14. The device of claim 1 wherein the dome switch assembly is secured to the housing by an adhesive.

15. The device of claim 1 wherein the outer layer defines a first alignment hole and the substrate defines a second alignment hole, the first and second alignment holes to be aligned with each other upon assembly of the dome switch assembly.

16. The device of claim 1 wherein the outer layer has a button actuator formed thereon.

17. The device of claim 16 wherein the outer layer defines a cavity, the cavity having therein a hardened substance, the cavity and the hardened substance defining the button actuator.

18. The device of claim 17 wherein the hardened substance is hardened glue.

* * * * *